United States Patent [19]
Imai et al.

[11] Patent Number: 5,930,283
[45] Date of Patent: Jul. 27, 1999

[54] LASER BEAM GENERATING APPARATUS

[75] Inventors: Yutaka Imai, Tokyo; Michio Oka, Kanagawa, both of Japan

[73] Assignee: Sony Corporation, Tokyo, Japan

[21] Appl. No.: 08/869,478

[22] Filed: Jun. 5, 1997

[30]  Foreign Application Priority Data

Jun. 6, 1996  [JP]  Japan ................................. P08-166905

[51] Int. Cl.[6] ....................................................... H01S 3/083

[52] U.S. Cl. ................................................. 372/94; 372/75

[58] Field of Search .................................. 372/94, 75, 92, 372/99, 71

[56]  References Cited

PUBLICATIONS

Harney, R.C., "Active laser resonator control techniques", Applied Optics, vol. 17, No. 11, pp. 1671–1672, Jun. 1, 1978.

*Primary Examiner*—James W. Davie
*Attorney, Agent, or Firm*—Hill & Simpson

[57]  ABSTRACT

The laser beam generating apparatus (light source apparatus) comprising a laser oscillator structured as a ring resonator is provided with a plurality of excitation light sources and a plurality of solid state laser active media excited by these excitation light sources respectively, and these solid state laser active media are disposed separately each other on the optical path in the ring resonator. A high power laser beam is obtained stably and efficiently.

7 Claims, 8 Drawing Sheets

WAIST OF RESONATOR MODE (THICK)

WAIST OF RESONATOR MODE (THIN)

FIG. I
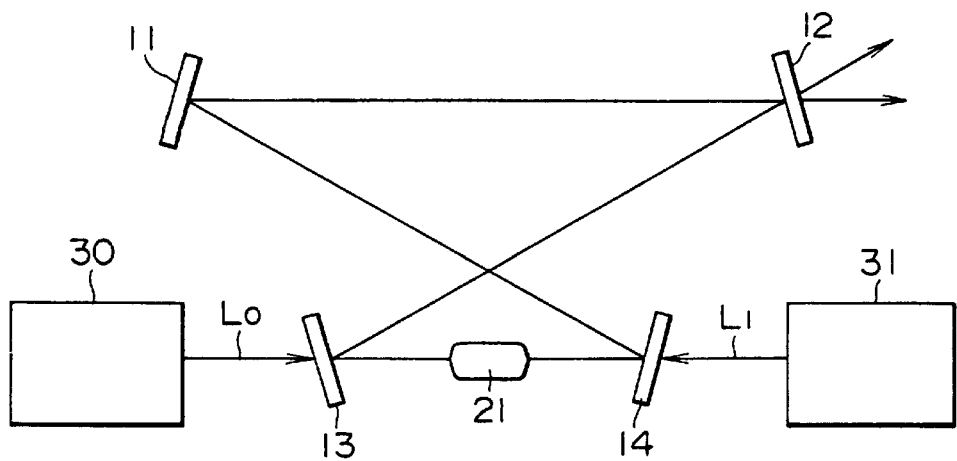
FIG. 2
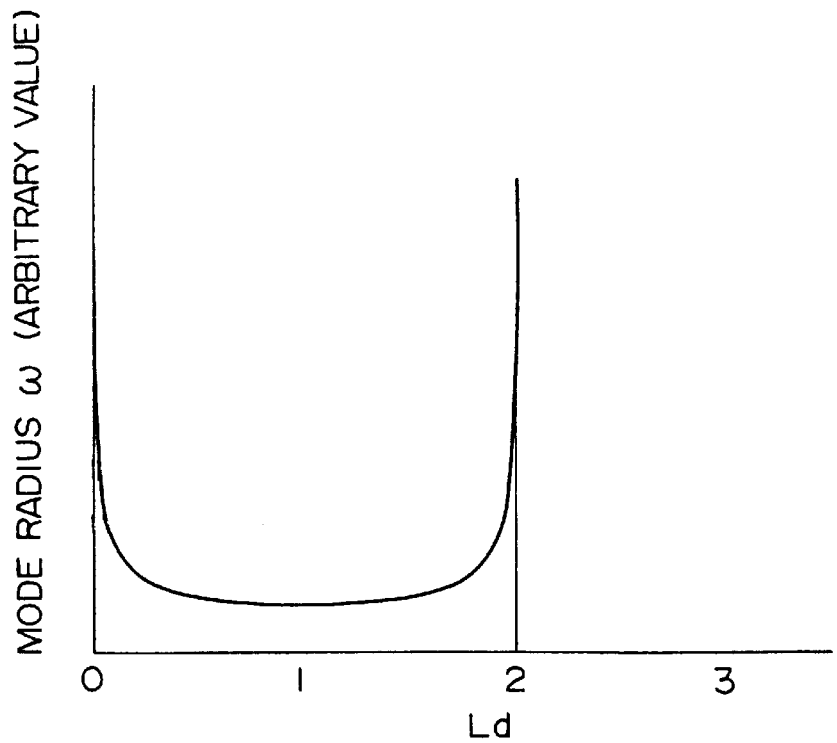

FIG. 3
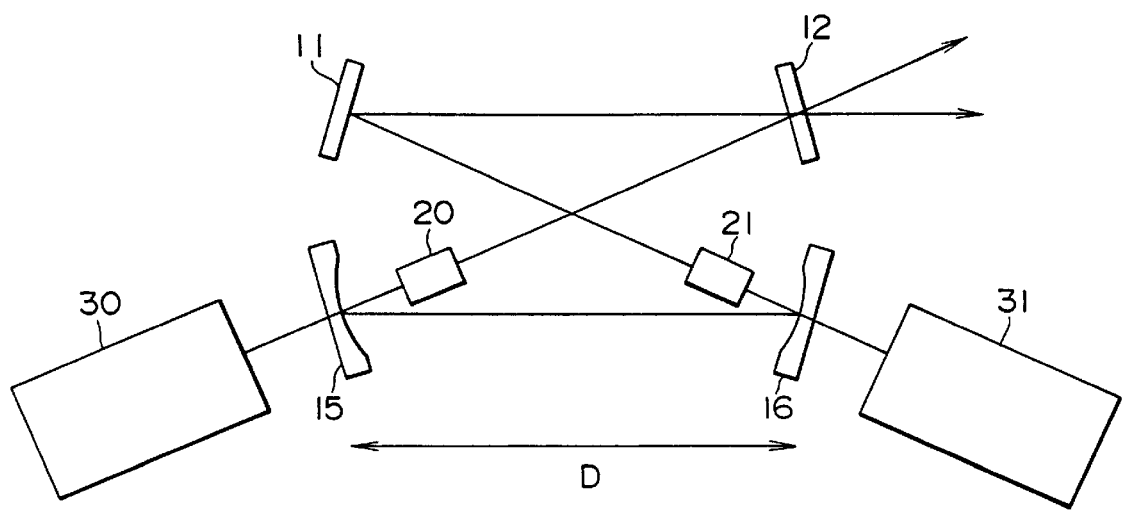
WAIST OF RESONATOR MODE (THICK)
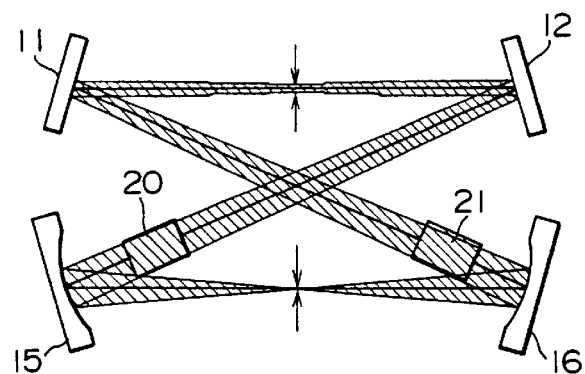
WAIST OF RESONATOR MODE (THIN)

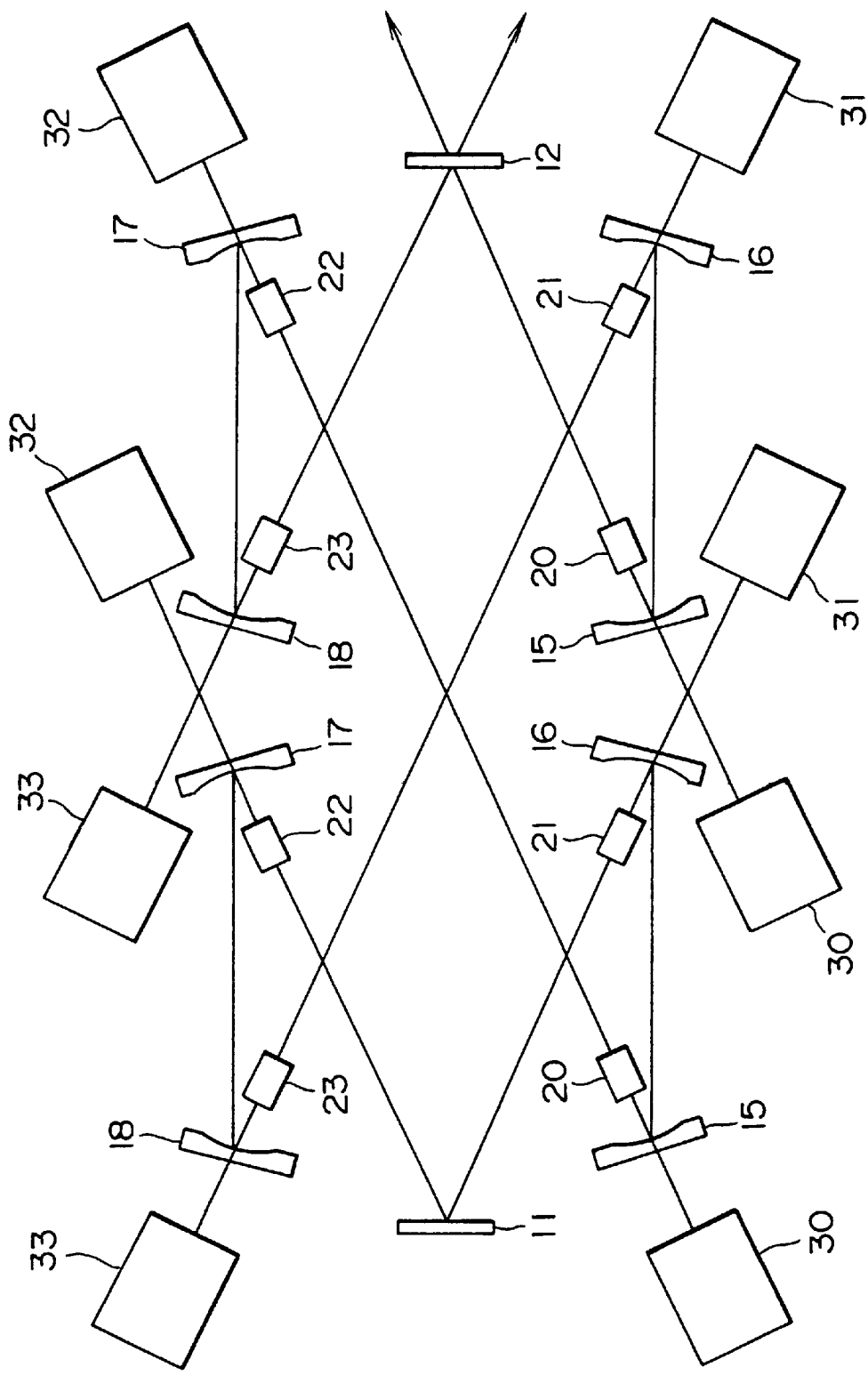

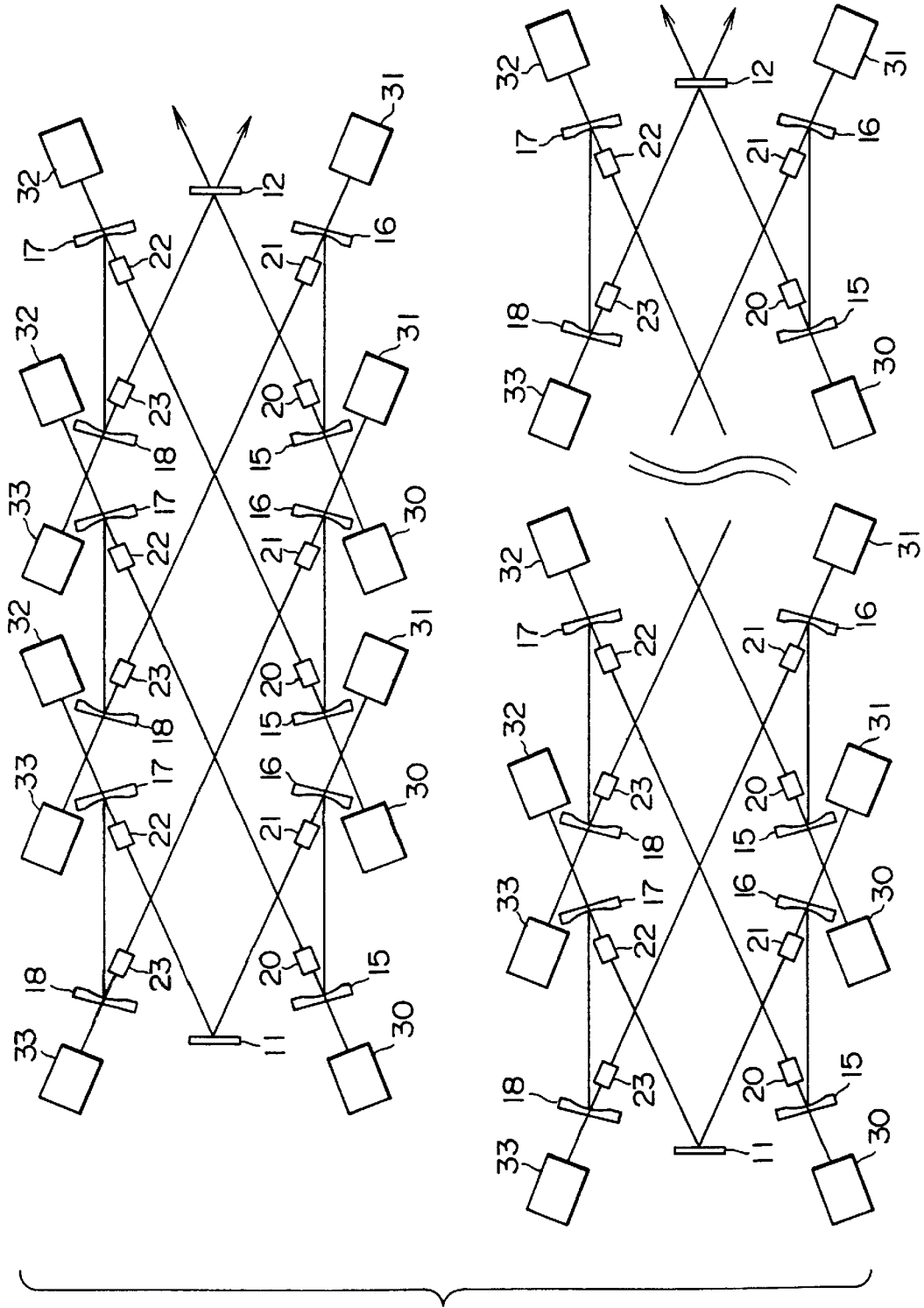

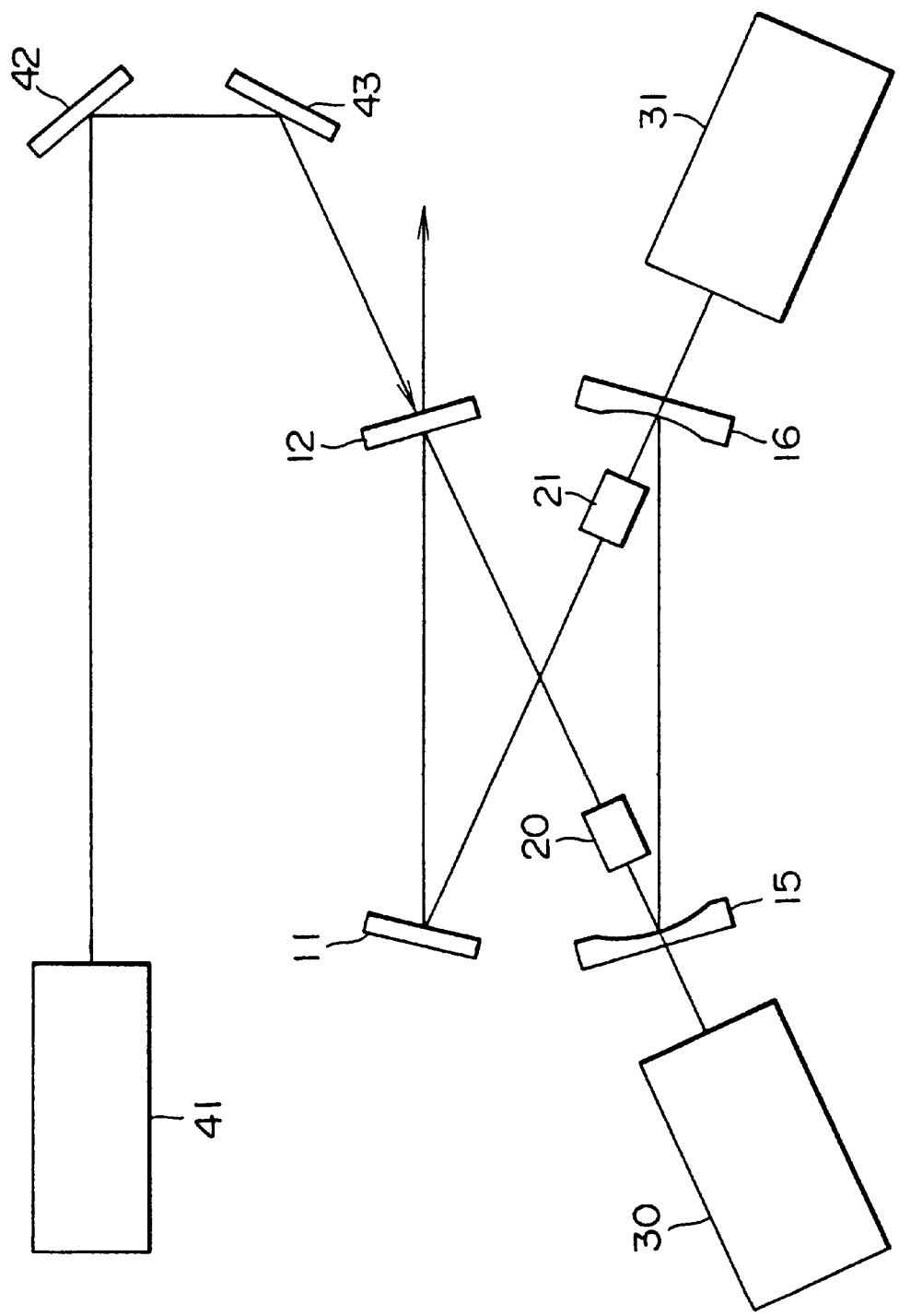

LASER BEAM GENERATING APPARATUS

BACKGROUND OF THE INVENTION

This invention relates to a laser beam generating apparatus, and particularly relates to a light source apparatus for generating high power, high stability, and high efficiency laser beam using solid state laser active medium.

Solid state lasers

A method in which a sold laser active medium is provided in a resonator and the active medium is excited to obtain a laser beam output has been used heretofore. For a laser light source called solid state laser, a semiconductor laser has been used as an excitation light source.

The laser beam source which utilizes a solid state laser active medium is excellent in serviceability. The reason is attributed to the fact that it is easy to adjust the oscillation spectrum of the semiconductor laser to the peak of absorption spectrum of the solid state laser active medium and it is easy to obtain output. The reason is also attributed to the fact that the output power of a solid state laser is proportional to the power of the excitation light source, and then the high power of an all solid state laser can be realized by using the high power semiconductor laser.

End face excitation and side face excitation

The excitation method of solid state laser active media classified roughly into side face excitation and end face excitation depending on the excitation method. The side face excitation is a method in which a medium is excited in the side direction with respect to the direction of laser oscillation, and the end face excitation is a method in which a medium is excited in the same direction as the direction of the laser output.

By applying the end face excitation, high efficient laser beam source is obtained because of spatial overlap between excitation beam and a resonator mode wider than that of the side excitation. Further, single transverse mode is easily obtained because a medium is excited from the same direction as the optical axis of oscillation mode of an oscillator. On the other side, the side face excitation can apply excitation using a plurality of excitation light sources, but the end face excitation can apply only limited number of excitation light sources which are allowed to enter in the end face, and high power is difficult to obtain.

Problems associated with all solid state lasers

It is a problem for obtaining high power of the laser beam source using a solid state laser active medium that the high power involves a problem of heat treatment in addition to the problem of the high power of a semiconductor laser which is an excitation light source. The increased power of an elicitation light source causes the generation of heat in the solid state laser active medium, and the temperature of the active medium increases. To prevent the thermal damage of the active medium, the generated heat should be removed efficiently.

Thermal lensing

In spite of removal of generated heat in the solid state laser active medium, the heat generation inevitably causes thermal gradient between the portion where excitation light impinges into the active medium and the portion which is cooled. Such thermal gradient in an active medium causes the local change in aberration, birefringence, and stress. It has been known that the active medium functions like a thin lens due to such thermal change. This function is called as thermal lensing (literature 1; S. D. Silverstri, P. L. Laporta, and V. Magni, "Pump Power Stability Range of Single-Mode Solid-State Lasers with Rod Thermal Lensing", IEEE J. Quantum Elec., Vol. 23, NO. 11, p 1999–2004 (1987)). The thermal lensing causes the mode change of a resonator, and causes various problems.

The thermal lensing is described briefly herein under. The light reflection effect due to thermal lensing is approximated by the light reflection effect by means of a thin lens. Assuming that the focal length of a thermal lens replaced by approximation is given by $f_{th}$, then refracting power $d_{th}$ is given as described herein under.

$$d_{th} = 1/f_{th} \tag{1}$$

It is known that $d_{th}$ is proportional to the absorption power $P_{pump}$ as shown by the following equation.

$$d_{th} \, P_{pump} \tag{2}$$

The thermal lensing of a solid state laser active medium due to high excitation causes the condition resembling that a thin lens with varying refracting power is inserted in a resonator. The thermal lensing in the resonator causes the changing in the mode of the resonator. Such unstable condition results in no resonation of the resonator and the output is not obtained.

The design method has been studied for realizing a resonator which resonates in spite of changing of refracting power of a resonator provided with a thermal lens due to thermal lensing (the literature 1 described hereinbefore). The heat removal and thermal lensing are serious problem for obtaining high power, and some device is required to avoid the adverse effect.

Design of conventional laser resonator and problems

Currently, a method has been proposed in which two excitation light sources are used for the end face excitation solid state laser, and one solid state laser active medium is excited by using these light sources (literature 2; A. J. Alfrey, "Simple 1 Micron Ring Laser Oscillators Pumped by Fiber-Coupled Laser Diodes", IEEE J. Quantum Elec., Vol. 30, No. 10, p 2350–p 2355 (1994)).

In this method, a solid state laser active medium 21 provided in a resonator is excited by means of total two excitation laser beam sources 30 and 31 from both sides of the medium 21 as shown in FIG. 1. In the drawing, 11, 12, 13, and 14 are plane mirrors respectively.

However, because two excitation lights $L_0$ and $L_1$ is impinged into the same active medium 21 for excitation, thin lenses generated by these excitation lights are formed adjacent closely each other. The total refracting power of these two close thin lenses is given by the sum of refraction power of respective thin lenses. It means that such excitation causes the same thermal lensing as that caused by using one high power excitation light source. Accordingly, such excitation causes the same condition as caused by inserting a medium having a very large refracting power, and the resonator is apt to be unstable.

Assuming that the refracting power due to thermal lensing generated in a solid state laser active medium 21 by means of excitation light sources 30 and 31 is d, and resonator length is L, then the beam matrix for one cycle of the resonator is given by the following equation.

$$\begin{bmatrix} 1 & 0 \\ d & 1 \end{bmatrix} \begin{bmatrix} 1 & l \\ 0 & 1 \end{bmatrix} \begin{bmatrix} 1 & 0 \\ d & 1 \end{bmatrix} \tag{3}$$

(literature 3; J. M. Eggleston, "Periodic Resonators for Average-Power Scaling of Stable-Resonator Solid-State Lasers" IEEE J. Quantum Elec., Vol. 24, No. 9, p 1821–p 1824, (1988)).

From the condition for self-regeneration of beam of one cycle, the mode radius ω is determined as shown herein under.

$$\omega^2 = \frac{L^2 \lambda}{\pi \sqrt{Ld(2-Ld)}} \quad (4)$$

The condition for the mode radius ω to have real value solution is determined as in the following.

$$d < Ld < 2 \quad (5)$$

This corresponds to the stable resonance region of the resonator involving thermal lensing.

FIG. 2 shows the mode radius in the stable resonance region represented in the form of a function of refraction power d. It is obvious that the mode radius is divergent to infinitive on the boundary line in the stable resonance region. This fact is a featured matter for considering the stable condition of a resonator.

The change of output from an excitation light source accompanies inevitably the change of the magnitude of mode of the resonator due to thermal lensing. Thereby, the overlap between the spot radius of the excitation light and the mode radius of the resonator changes. The high extent of overlapping between the spot radius and mode radius results in the low output efficiency and poor quality of the beam.

The use of the flat portion near the limit value in the stable resonance region shown in FIG. 2 results in the high performance laser beam source. However, in the case that only one solid state laser active medium is used as the conventional example described herein above, it can be used only in the range restricted by the equation (5). Therefore it is not possible to expand the stable resonance region no more.

As the result, in the conventional example, the output of 8.5 W is obtained with total excitation of 26 W. The heat of 17.5 W which is not outputted as the output is absorbed in the solid state laser active medium, and the heat should be removed. For this type of resonator design, the output range obtained in the stable resonance region is limited within about 8.5 W.

Problem of Conventional multi-excitation type laser resonator (slab type laser)

The slab type laser is proposed as a light source device provided with increased number of excitation light sources (literature 4: CLEO 1990, CMF4, CMF6). Generally in a slab laser, excitation lights are incident upon a rod like solid state laser active medium along the resonator mode (one type of end face excitation) for excitation in multiple reflection. Thereby the total excitation light source is increased and the high power laser is possible to be obtained.

However, this type of laser is still inconvenient in removal of heat generated in the solid state laser active medium as the above-mentioned conventional example, and further thermal lensing due to excitation generates in adjacent positions, the thermal lensing makes the resonator unstable, this is a problem.

Every conventional examples described hereinbefore do not involve a measure for separating and dispersing the thermal lensing and for suppressing the adverse effect of thermal lensing. The concentration of solid state laser active medium in a resonator not only makes the heat removal problem difficult to be solved but also makes the stable region of the resonator narrow.

SUMMARY OF THE INVENTION

The present invention relates to a laser beam generating apparatus, and particularly relates to a light source apparatus for generating high power, high stability, and high efficiency laser beam using solid state laser active medium.

It is the object of the present invention to provides an apparatus which is capable of generating high power, high stability, and high efficiency laser beam, particularly to provides a light source apparatus using solid state laser active medium, without problems described herein under due to thermal lensing;

(1) the difficulty in cooling solid state laser active medium arising along with high power excitation of a light source, (2) the limited stable laser output region due to the thermal lensing of solid laser active medium, and (3) the thermal lensing problem arising along with scaling up of output by using a plurality of excitation light sources.

The inventors of the present invention studied to solve the above-mentioned problems, and was found that the above-mentioned problems were solved and the high power laser beam was obtained stably and efficiently by applying a method in which, for example, two solid state laser active media were provided separately in a ring resonator, these two active media were excited using separate excitation light sources individually, and these solid state laser active media were provided near concave mirrors respectively.

In detail, the present invention relates to a laser beam generating apparatus having the structure of a ring laser resonator provided with a plurality of excitation light sources, and a plurality of solid state laser active media excited by means of the respective excitation light sources, wherein these solid state laser active media are disposed separately each other on the optical axis in the ring resonator The laser beam generating apparatus of the present invention exhibits remarkable effect as described in 1 to 3 herein under not like the conventional laser beam generating apparatus.

1. Advantage of distributed cooling of solid state laser active media.

According to the structure of the present invention, a plurality of solid state laser active media (for example, two) is used, and these active media are excited individually by respective excitation light sources, thereby the excitation power per each active medium is, for example, ½. Therefore in this case, because each excitation intensity is ½, the heat removal may be ½, and the active media are cooled easily. Further, because the heat source is separated to two locations, the space for disposing respective cooling mechanisms are easily available.

2. Advantage of wide stable region due to thermal lensing.

By disposing a plurality of (for example, two) active media separately, the refracting power due to thermal lensing of each active medium can be divided into ½, thereby wide stable resonance region, which is usually restricted due to thermal lensing, is available for each active medium. The wider stable resonance range is available by way of the present invention in which active media are disposed separately than by way of the conventional method in which two media having refracting power are disposed adjacent closely in a resonator (thin lenses due to thermal lensing are positioned closely each other).

3. Advantage of easy designing of a resonator because respective sets of a solid state laser active medium and an excitation light source can be disposed symmetrically.

In the laser beam generating apparatus of the present invention, a ring resonator comprises at least one of resonance mirror or reflecting surface having high reflectance of the wavelength of the light obtained as the laser output and tow concave mirrors, the two solid state laser active media is disposed on the optical path in the ring resonator in the laser resonator, two excitation light source corresponding respectively to the two solid state laser active media are used, each laser beam from the excitation light sources transmits the respective concave mirrors, the solid state laser active media are excited in end face excitation manner, and the distance between the two concave mirrors is approximately equal to the radius of curvature of these concave mirrors desirably.

To widen the allowable width of the overlap between the mode in the solid state laser active medium and the spot of the excitation light, it is required to dispose the solid state laser active medium at the portion where the mode of the resonator is as large as possible. The larger overlapped portion helps to adjust the optical axis easily and to enhance the output efficiency. Therefore, it is desirable to dispose the solid state laser active medium closely to the concave mirror where the mode of the resonator is largest.

Two positions are possible to dispose the solid state laser active medium closely to the concave mirror. Two light paths are possible in the ring resonator between the concave mirrors, the one is the long optical path and the other one is short optical path. The beam of the long optical path between two concave mirrors is thinned more gradually than the beam of the short optical path. The gradual-thinning results in the smaller change of beam radius when the beam leaves from the concave mirror. Therefore, the radius of the beam can be larger and more advantageous in the case that the solid state laser active medium is disposed at the position where the optical path is longer than in the case that the solid state laser active medium is disposed at the position where the optical path is shorter.

The above-mentioned resonator design is used as a unit, and 2n solid state laser active media, 2n concave mirrors, and 2n excitation light sources are used, a structure which is formed by combining n units of above-mentioned designs may be used (wherein n is an integer of 2 or larger).

For example, n sets of the resonator comprising solid state laser active mediums, excitation light sources, and concave mirrors are arranged successively to form a single resonator, and as a whole, 2n solid state laser active media are excited using 2n excitation light source.

The above-mentioned resonator structure is used as a unit, and a plurality of the units is connected and arranged symmetrically to form a single resonator as a whole. In such single resonator, the limit of the stable region of the single resonator due to thermal lensing generated in each solid state laser active medium is equal to the limit of the stable region of the unit resonator structure, and the whole excitation light source becomes a high power excitation, therefore the output is very high finally. That is, the whole stable region range where output is obtained becomes wide. (refer to the above-mentioned literature 3)

Further, using a laser beam source which emits laser beam that the power of which is smaller than the obtained laser output beam but the frequency is stable is used as the master laser, the laser beam is incident onto the above-mentioned solid state laser active medium for injection-locking. By applying such injection-locking, a low power laser beam source excellent in frequency stability can control the oscillation frequency of large power laser (literature 5: C. D. Nabors et. al. "Injection locking of a 13-" cw Nd: YAG ring laser", Optics Letters, Vol. 14, No. 21, (1989), and "injection locking and mode locking", Quantum Electronic Engineering, p104–105, Corona company).

BRIEF DESCRIPTION OF THE DRAWINGS

FIG. 1 is a structural diagram of a conventional solid state laser in which one solid state laser active medium is excited.

FIG. 2 is a graph for describing the change of mode radius in the solid state laser active medium of a conventional resonator due to thermal lensing.

FIG. 3 is a structural diagram of a laser beam generating apparatus (light source apparatus) in accordance with the first embodiment of the present invention.

FIG. 11 is a structural diagram of a laser beam generating apparatus (light source apparatus) in accordance with another embodiment of the present invention in which eight solid state laser active media are excited.

FIG. 12 is a structural diagram of a laser beam generating apparatus (light source apparatus) in accordance with another embodiment of the present invention in which 2n solid state laser active media are excited.

FIG. 13 is a structural diagram of a laser beam generating apparatus (light source apparatus) in accordance with the present invention in which injection-locking is applied.

DETAILED DESCRIPTION OF THE PREFERRED EMBODIMENTS

Figure 4:
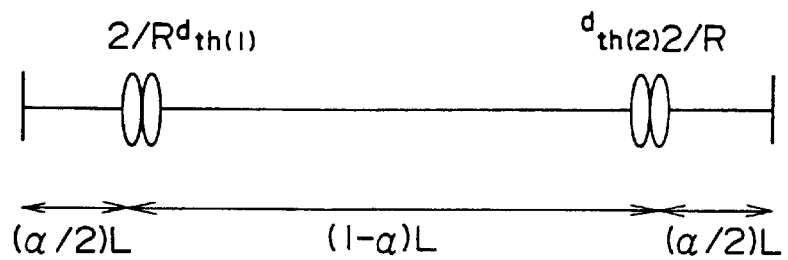
FIG. 4 is a schematic diagram for illustrating the structure of the apparatus.

Embodiments of the present invention will be described in detail hereinafter with reference to the drawings.

Advantage in heat removal

FIG. 3 shows the structure of a ring resonator (laser oscillator) in accordance with the first embodiment of the present invention.

In FIG. 3, the ring resonator is provided with flat reflection mirrors 11 and 12, and concave mirrors 15 and 16, and two solid state laser active media 20 and 21 consisting of Nd : YAG crystal are provided in the resonator. The respective active media 20 and 21 are excited separately by two Nd : YAG laser excitation light sources 30 and 31.

A resonator of the present invention is definitely different from conventional resonators described hereinbefore in that two solid state laser active media 20 and 21 are disposed separately in a resonator. The excitation light source 30, concave mirror 15, and solid state laser active medium 20 are symmetrically disposed with respect to the excitation light source 31, concave mirror 16, and solid state laser active medium 21.

By structuring a resonator in such a manner, the power required to excite the respective active media 20 and 21 can be reduced to ½ in comparison with a conventional resonator. Separate cooling of the respective active media 20 and 21 helps to cool easily each active medium. Generally, thermoelectric cooling utilizing Peltier element is applied to cool a slid state laser active medium. By separate disposition of heat sources, only a small element each is sufficient to cool each heat source consistently.

Widening of stable region due to thermal lensing

Efficient widening of stable region of a ring resonator in accordance with the present invention is described herein under. Excitation of two solid state laser active media 20 and 21 respectively by means of two excitation light sources 30 and 31 generates a thin lens respectively in each active medium due to thermal lensing. As it is in a conventional resonator, excitation of one solid state laser active medium by means of two excitation light source generates two thin lenses adjacent closely each other in one active media. In the case that two thin lenses are placed adjacent closely each other, the total refraction power of these lenses is given by the sum of refraction power of each lens. Therefore, the thermal lensing of these solid state laser active media is very severe.

However, in the embodiment of the present invention, separate disposition of two solid state active media and separate excitation reduce the refraction power due to thermal lensing of each active medium 20 or 21 to ½, the adverse effect of thermal lensing on the stability of a resonator is suppressed.

The adverse effect is calculated quantitatively herein under. Parameters are described with reference to FIG. 3. The resonator length is represented by L, the distance between the concave mirrors 15 and 16 is represented by D, the radius of curvature of concave mirrors 15 and 16 are represented by R, and the distance between the solid state laser active media 20 and 21 and the concave mirrors 15 and 16 is represented by $\Delta$, and the resonator structural ratio $\alpha$ represented by the equation;

$$D = \alpha L \tag{6}$$

is introduced to reduce the length dimension to dimensionless value.

The distance $\Delta$ between solid state laser active medium 20 and the concave mirror 15 may be approximated to be nearly zero for simplification, that is, the solid state laser active medium 20 is disposed adjacent closely to the concave mirror 15. The refractive index of YAG crystal of the solid state laser active medium is approximated to be nearly 1 for convenience, the length is ignored, and only the effect of thin lens corresponding to thermal lensing is taken into consideration. The same is applied to the solid state laser active medium 21 and the concave mirror 16.

By such simplification, the structure of one cycle of the above-mentioned resonator is shown in FIG. 4. If the intensity of the excitation light sources 30 and 31 are the same, then the refraction power of thermal lensing of the solid state laser active media 20 and 21 are the same value, that is, $d_{th(1)} = d_{th(2)} = d_{th} = 1/f_{th}$.

d is expressed by the following equation (7):

$$d = d_{th} + 2/R \tag{7}$$

Figure 5:
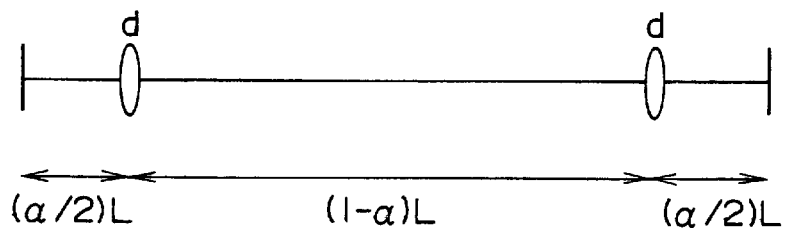
FIG. 5 is a schematic diagram in which the structure of the apparatus is simplified.

Then, the structure shown in FIG. 4 is equivalent to the structure shown in FIG. 5.

Next, the above-mentioned optical matrix of the resonator is solved to determine the stabilization condition. The optical matrix for one cycle is represented by the following equation (8) referring the one solid state laser active medium as the reference plane.

$$\begin{pmatrix} A & B \\ C & D \end{pmatrix} = \begin{bmatrix} 1 & 0 \\ d/2 & 1 \end{bmatrix} \begin{bmatrix} 1 & L(1-\alpha) \\ 0 & 1 \end{bmatrix} \begin{bmatrix} 1 & 0 \\ d & 1 \end{bmatrix} \begin{bmatrix} 1 & L\alpha \\ 0 & 1 \end{bmatrix} \begin{bmatrix} 1 & 0 \\ d/2 & 1 \end{bmatrix} \tag{8}$$

$$\text{If, } \frac{1}{q} \equiv \frac{1}{R} + i\frac{\lambda}{\pi\omega^2} \tag{9}$$

for self-regeneration of light after one cycle, $$q = \frac{Aq + B}{Cq + D} \tag{10}$$

may holds. The equation (10) gives the following solution.

$$\frac{1}{R} + i\frac{\lambda}{\pi\omega^2} = \frac{D-A}{2B} \pm i\frac{\sqrt{1-(A+D)^2/4}}{B} \tag{11}$$

Wherein, the relation AD−BC=1 is used. $\omega$ is the resonator mode radius in YAG crystal.

If $\omega$ is a real value, a stable mode is formed in the resonator. The mode radius is calculated as shown in the following equation:

$$\omega^2 = \frac{L\lambda}{\pi} \cdot \frac{2L(1 - \alpha Ld + \alpha^2 Ld)}{\sqrt{Ld(2 - \alpha Ld)(2 - Ld + \alpha Ld)(2 - \alpha Ld + \alpha^2 Ld)}} \tag{12}$$

Accordingly, the condition for giving a real value to $\omega$ is represented by the following equation.

$$Ld(2-\alpha Ld)(2-Ld+\alpha Ld)(2-\alpha Ld+\alpha^2 Ld) > 0 \tag{13}$$

The boundary value of the stable condition is given by the following four equations:

$$\left. \begin{array}{l} Ld = 0 \\ Ld = \dfrac{2}{\alpha} \\ Ld = \dfrac{2}{1-\alpha} \\ Ld = \dfrac{2}{\alpha(1-\alpha)} \end{array} \right\} \tag{14}$$

Figure 6:
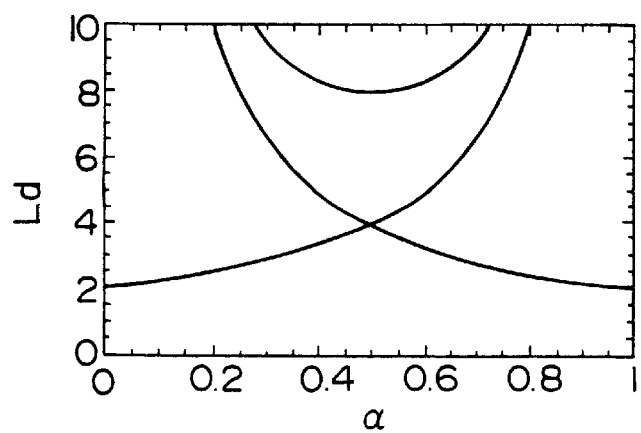
FIG. 6 is a graph for describing the stable resonance region.

The boundary values gives a region (blacked region) shown in FIG. 6. x-axis represents the structural ratio of a resonator $\alpha$=D/L, and y-axis represents the value Ld (dimensionless) that the refraction power of thermal lensing is normalized with the resonator length L. On the boundary line, the equation gives divergence and instability. The axis of ordinate is represented by $d=(1/f_{th})+(2/R)$.

Figure 7:
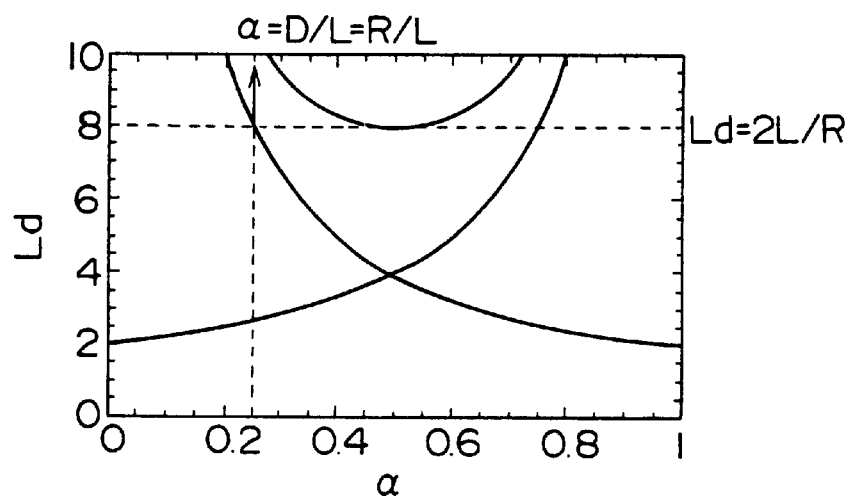
FIG. 7 is a graph for describing the condition change of a resonator due to thermal lensing of the apparatus.

While power is not supplied, that is;

$$fn \to \infty (d = 2/R) \tag{15}$$

the resonator is in the starting condition shown by the arrow shown in FIG. 7. The position of the starting point is represented by the equation (16).

$$(\alpha = D/L, Ld = 2L/R) \tag{16}$$

With increasing the excitation light power, the refraction power $1/f_{th}$ due to thermal lensing increases (focal length $f_{th}$ becomes shorter). When, the condition of the resonator is shifted to the arrow direction. If the condition of the resonator is in the stable region, an output is obtained.

FIG. 7 involves the case of α=D/L=0.25. The starting point in the figure is positioned on the boundary line in order to widen the stable region of the resonator mode which changes dynamically with changing of the excitation light power. The condition required for the starting point to be positioned on the boundary line is obtained from the above-mentioned equation (14);

$$Ld = \frac{2}{\alpha} = \frac{2L}{R} = \frac{2}{D/L} \quad \quad (17)$$
$$\therefore \alpha = \frac{D}{L}$$

that is, $$D=R \quad \quad (18)$$

The stable resonance region of refraction power under the above-mentioned condition is represented by the equation (19):

$$\Delta d = \frac{2}{(1-\alpha)L} = \frac{2}{L-D} \quad \quad (19)$$

The point to be noticed is that the equation for α=0 is equivalent to the equation (5) obtained for the prior art.

The calculation is based on the condition Δ to 0 hereinbefore, however, because actually the resonator mode has a certain extent of radius, it is difficult to place the concave mirror and solid state laser active medium adjacent closely together, and the concave mirror is inevitably placed distant from the solid state laser active medium. In such case, it is preferable to place the solid sate laser active medium on the optical path having thicker waist of the mode in the resonator namely on the longer optical path between the concave mirrors because the beam is thinned gradually and the spot diameter can be large. Further, the distance D in FIG. 3 is difficult to be determined accurately, therefore, it is not preferable to place the solid state laser active medium on the place because the property of the resonator is difficult to be designed.

Herein, in the case that the distance from the concave mirror to the waist of the resonator mode is far (long), the waist of the mode is thick, namely thinned gradually. On the other hand, in the case that the distance from the concave mirror to the waist of the resonator mode is short, the waist of the mode is thinned steeply and the waist size becomes thin.

The mode size in the solid state laser active medium should be designed so as to be as large as possible because the adjustment of the spot size of the excitation light source to the mode size in the active medium is the important factor which is the determinant of the quality of the laser of this sort. The larger mode size helps to adjust easily the spot size to the mode size.

Advantage of this embodiment over the conventional example in the stable region

Based on the above-mentioned consideration, the stable region ranges wider 30% or more in comparison with the conventional art (α=0 in the equation (19), namely the equation (5)) under the disposition condition α=D/L=0.25, and further is maximized to double stable region width under the condition α=0.5 (refer to FIG. 7).

Experimentally, the following example is confirmed. In FIG. 3, the concave mirrors 15 and 16 having a radius of curvature of 100 mm were used, The distance D was 100 mm, and the resonator length L of the resonator was 400 mm. The excitation light sources 30 and 31 of 12 W output were used.

Figure 8:
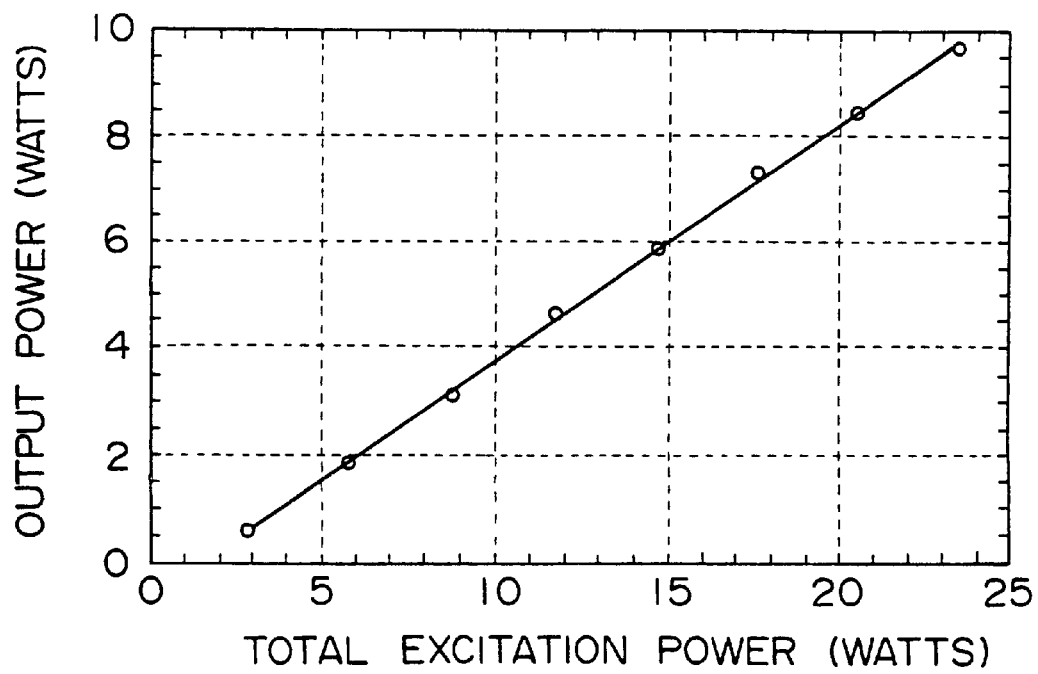
FIG. 8 is a graph for describing the output power actually obtained using the apparatus.

Under this condition, the experiment gave the relation between the excitation light power and output power as the result shown in FIG. 8. As it is obvious in the figure, the total excitation power of 24 W gave the 10 W output as the result. Outside of the stable region, the output decreases rapidly because the resonator does not resonate. It is obvious that the range from zero power excitation to the excitation of 10 W or higher is included within the stable region from the fact that the output is linear in the range.

Figure 9:
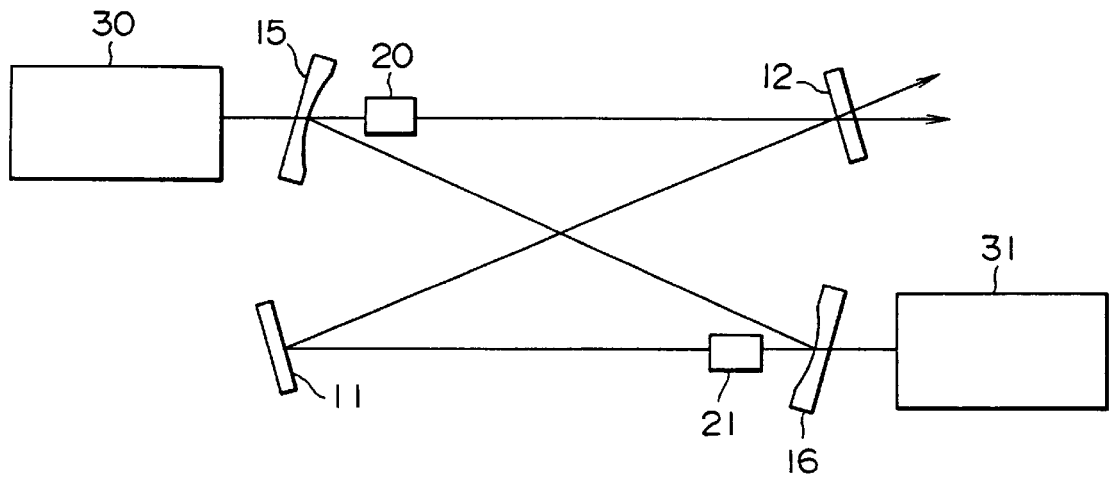
FIG. 9 is a structural diagram of a laser beam generating apparatus (light source apparatus) in accordance with another embodiment of the present invention.

FIG. 9 shows the structure of a ring resonator in accordance with the second embodiment of the present invention.

The second embodiment has the same structure as that of the first embodiment shown in FIG. 3 excepting that the disposition of respective optical elements is changed from axial symmetry disposition shown in FIG. 3 to rotational symmetry disposition.

FIG. 10 to FIG. 13 show the structure of ring resonators in accordance with variously modified embodiments of the present invention.

High power output obtained by exciting many solid state laser active media

Figure 10:
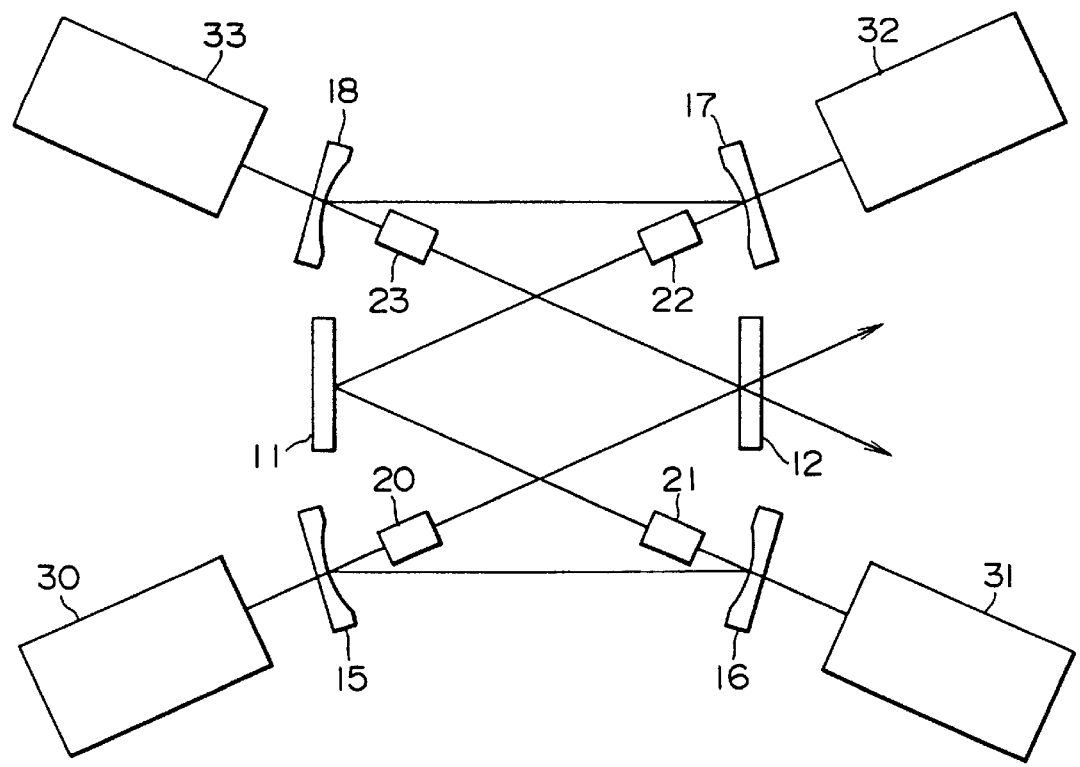
FIG. 10 is a structural diagram of a laser beam generating apparatus (light source apparatus) in accordance with another embodiment of the present invention in which four solid state laser active media are excited.

In the resonator shown in FIG. 3, resonators having the same structure (set of an excitation light source, a concave mirror, and a solid state laser active medium) are disposed symmetrically, and constitute a resonator which is excited using may laser active media as a whole. In this case for example as shown in FIG. 10, a resonator may be structured so that flat reflecting mirrors 11 and 12 are used to combine two resonators to form a single resonator. That is, symmetrically with the unit shown in FIG. 3, elements of an excitation light source 32,—a concave mirror 17—solid state laser active medium 22 and an excitation light source 33—concave mirror 18—solid state laser active medium 23 are disposed to form the resonator.

Though many units are provided, the stable region of each active medium does not change because the structure of a pair of resonators partitioned (connected optically) by the flat reflecting mirrors 11 and 12 is the same. On the other hand, the number of excitation light sources is doubled in comparison with the example shown in FIG. 3, therefore the finally obtained output is doubled.

By arranging two resonators shown in FIG. 10, a resonator which can output four times output power of the resonator shown in FIG. 3 can be structured as shown in FIG. 11. Further as shown in FIG. 12, by adding more sets of resonators, a resonator which can output higher output power can be structured.

Currently, semiconductor excitation light sources of 10 W output class have been commercially available. The 10 W class excitation light source provided in a laser resonator which utilizes Nd: YAG crystal as solid state laser active medium is particularly convenient among all solid state laser because the focal length of thermal lensing of Nd: YAG crystal caused by excitation is about 10 cm to 40 cm, and this length is approximately equal to the resonator length of popular all solid state laser design. To prevent thermal lensing for excitation of 10 W or higher, special device such as shorter resonator length should be required for matching with the shorter focal length of thermal lensing.

In view of the current resonator size, the 10 W class excitation light source is the light source with the maximum power that the thermal lensing problem is solved relatively easily. In the present invention, a plurality of semiconductor lasers of the 10 W class is used to excite Nd: YAG crystal for each semiconductor laser, and this method is very effective.

Synchronous injection

A ring type resonator emits basically laser output oscillation in two directions. It is preferable to apply synchronous injection to arrange the two oscillation to one oscillation and stabilize the laser output.

In detail, as shown in FIG. 13, in the same structure as shown in FIG. 3, the laser beam sources 30 and 31 are used as slave laser and an additional laser light source which emits a laser with lower output than the slave laser but with stable frequency is used as master laser 41, and the laser from the master laser 41 is injected to the slave lasers through flat mirrors 42 and 43 for synchronous injection.

By applying such synchronous injection, the oscillation frequency of high output laser can be controlled using a low output laser beam source with high frequency stability.

Embodiments of the present invention are described hereinbefore, the above-mentioned embodiments can be modified variously within the technical scope of the present invention.

For example, the disposition of respective optical elements which are components of the above-mentioned ring resonator may be changed, and the material and operational method applied for the resonator is by no means limited to the examples described hereinbefore.

The disposition and the number of the above-mentioned solid state laser active medium may be changed, for example, a plurality of solid state laser active media may be disposed in series on one optical path. Such arrangement likely mitigates additionally the adverse effect of thermal lensing.

The moving direction of resonant laser beam may be changed using mirrors, and the direction can be selected depending on the application.

What is claimed is:

1. A laser beam generating apparatus comprising:

a laser oscillator having the structure of a ring resonator, said ring resonator having at least one resonance mirror or reflection surface having high reflectance of the light having wavelength of the obtained laser beam output and two concave mirrors, two solid state laser active media disposed separately from each other on the optical path in said ring resonator, and two excitation light sources corresponding to said two solid state laser media, said solid state laser active media being excited respectively by said excitation light sources, wherein the excitation light from said excitation light source transmits light to said concave mirrors respectively and end face-excites said solid state laser active media and the distance between said two concave mirrors is equal to the radius of curvature of these concave mirrors.

2. The laser beam generating apparatus as claimed in claim 1, wherein said solid state laser active media are provided on the longer optical path out of optical paths formed between two concave mirrors in said ring resonator.

3. The laser beam generating apparatus as claimed in claim 1, wherein a laser beam source which emits a frequency stable laser beam with an output power lower than the obtained output laser beam is used as a master laser to be injected to said solid state laser active media for synchronous injection.

4. A laser beam generating apparatus comprising:

a laser oscillator having the structure of a ring resonator, said ring resonator having at least one resonance mirror or reflection surface having high reflectance of the light having wavelength of the obtained laser beam output and 2n concave mirrors, 2n solid state laser active media disposed on the optical path in said ring resonator, said solid state laser media being disposed separately from each other on the optical path of said ring resonator, and 2n excitation light sources corresponding respectively to said 2n solid state laser media, said solid state laser media being excited respectively by said excitation light sources, wherein the excitation light from said excitation light sources is transmitted to said concave mirrors respectively and end face-excites said solid state laser active media and the distance between said 2n concave mirrors is equal to the radius of curvature of these concave mirrors, wherein n represents a natural number of 2 or more.

5. A laser beam generating apparatus comprising:

a ring resonator having at least one resonance surface having a high reflectance with respect to light having a wavelength of an obtained laser beam output and a plurality of concave mirrors, a like plurality of solid state laser active media separately disposed along on the optical path in said ring resonator, and a like plurality of excitation light sources corresponding respectively to said plurality of solid state laser media, said plurality of solid state laser active media being excited respectively by said excitation light sources, wherein excitation light from said excitation light sources is transmitted to said concave mirrors and end-face excites said solid state laser active media and the distance between said two concave mirrors is equal to the radius of curvature of these concave mirrors.

6. The laser beam generating apparatus as claimed in claim 5, wherein a laser beam source which emits a frequency stable laser beam with an output power lower than the obtained output laser beam is used as a master laser which is injected into said solid state laser active media for synchronous injection.

7. The laser beam generating apparatus as claimed in claim 5, wherein said solid state active laser media are provided on the longer optical path out of the various optical paths formed between said concave mirrors and said ring resonator.

* * * * *